United States Patent [19]
Keiter, Jr.

[11] 3,757,945
[45] Sept. 11, 1973

[54] APPARATUS AND METHOD FOR SEPARATING HEARTS AND LIVERS FROM A MIXTURE THEREOF

[75] Inventor: Marlin Edward Keiter, Jr., Berlin, Md.

[73] Assignee: Showell Poultry, Inc., Showell, Md.

[22] Filed: Feb. 4, 1972

[21] Appl. No.: 223,673

[52] U.S. Cl. ............................................. 209/114
[51] Int. Cl. ............................................. B07c 3/02
[58] Field of Search .................... 209/114, 116, 117, 209/118

[56] References Cited
UNITED STATES PATENTS
1,744,967  1/1930  Johnson .......................... 209/114 X
2,318,976  5/1943  Stevens ............................. 209/114
3,211,288  10/1965  Peis ................................. 209/114 X Primary Examiner—Richard A. Schacher
Attorney—John J. Byrne et al.

[57] ABSTRACT

A conveyor system having a moving belt depositing a mixture of hearts and livers to an inclined, moving conveyor which conveyor has a surface to which chicken livers will adhere but to which chicken hearts will not adhere when said inclined conveyor is moving at a selected speed and disposed at a selected angle.

4 Claims, 1 Drawing Figure

Patented Sept. 11, 1973            3,757,945
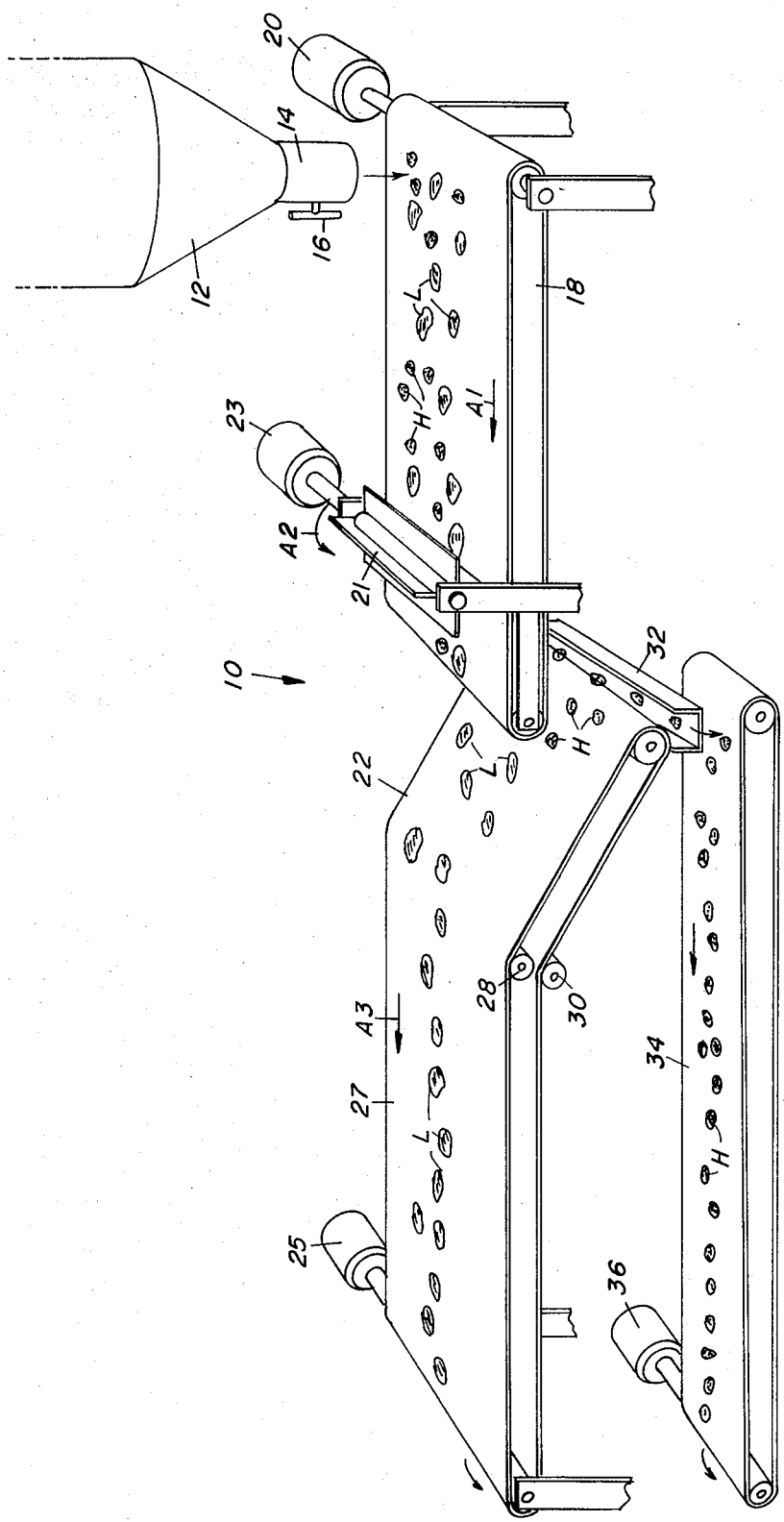

APPARATUS AND METHOD FOR SEPARATING HEARTS AND LIVERS FROM A MIXTURE THEREOF

The present invention relates to the food processing art and, more particularly, to the apparatus for separating relatively soft, pliant chicken livers from relatively hard-surfaced chicken hearts. The apparatus greatly reduces the number of workers necessary to perform this function.

Much ingenious and varied equipment has been developed in the art of separating elements of food products from one another. For instance, there is a wide range of machinery for use in separating meat from bones, skin from flesh, flesh from gristle, and the like. The chicken industry, as an example, has been favored with a great deal of such equipment and the resulting cost savings accomplished thereby. These developments have aided in the rapid growth of this sector of the agri-economy. However, there is one area in the processing chain that, heretofore, was performed efficiently only by hand; that is, the separation of chicken hearts from chicken livers. The conventional method of accomplishing this function is to have a slowly moving conveyor to carry a mixture of these products past workers who manually pick and remove the hearts from the belt. It is a primary objective of this invention to provide an inexpensive, automatic, and efficient method of separating hearts from livers while greatly reducing the manual labor involved.

Another objective of this invention is to provide an apparatus for separating hearts and livers from a mixture thereof by providing an inclined, moving, conveyor belt, the outer surface of which has a coefficient of friction of a type to which the more pliant and "sticky" livers will adhere and to which the more rounded, solid hearts will not adhere. The hearts thus tumble and roll to the lower end of the belt while the livers are carried to the upper end of the belt.

Another objective of this invention is to provide an improved construction which permits easy adjustability and maintenance and which is so designed that the separated, edible parts are gently handled and not damaged when subjected to the process.

Accordingly, it is an objective of this invention to present an apparatus for segregating articles and, particularly, chicken hearts and chicken livers, in an automatic, thorough, and complete manner, without damage to the product.

These and other objects of this invention will become more fully apparent upon reference to the following description and the attached drawing which is a diagrammatic, isometric view of the apparatus of this invention.

Referring now to the drawing, the numeral 10 indicates the apparatus of this invention. In previous processing steps, the hearts and livers of the chicken have been segregated and collected in a hopper indicated by the numeral 12. The hopper is of a type having an outlet 14 through which livers L and hearts H are dispensed at a rate selected by control 16. An endless conveyor belt 18 has a receiving end disposed beneath the outlet 14 and the upper run of which is moved in the direction of the arrow A1, by way of a drive means 20.

Intermediate the length of the upper run is a paddle 21 which levels the mixture so that it is more uniformly deposited on an inclined conveyor 22. The paddle is driven in the direction indicated by arrow A-2 by a power drive 23. A chicken heart is relatively smooth, having a somewhat cylindrical shape which will not readily adhere to most surfaces. The livers L, on the other hand, are relatively sticky and pliant, with a tendency to conform to the surface to which they are deposited. The exterior of the conveyor 22 has a coefficient of friction to which the chicken livers will adhere and to which the hearts will not adhere when the conveyor is at an angle of approximately 30° and moved at normal speeds. A relatively smooth, rubber belting will accomplish this result when the conveyor is inclined at approximately 30°. An embossed, food-grade, white belt is good for these purposes. The belt is driven at approximately two feet per second by the drive means 25. The belt 22 has its direction of travel converted to horizontal by way of rollers 28 and 30. The direction of movement is, of course, in the direction indicated by the arrow A3.

As seen in the drawings, the livers L will adhere to the belting and move to the horizontal portion 27. The heart H will tumble and rotate and fall from the lower end of the conveyor into the heart chute or tray 32. The tray is also inclined at an angle whereby the hearts are delivered to a horizontally disposed collector belt 34 driven by the drive means 36. In the interest of clarity, all of the various support means have not been shown but such supports present no difficulty to those skilled in the art.

In operation, the hearts and livers are first deposited at the reception end of belt 18. The paddle wheel uniformly distributes the hearts and livers over the belt and they are then deposited on the belt 22. The livers are collected at position P1. The hearts, on the other hand, move to the lower end of conveyor 22 and are collected at position P2 via the chute 32 and conveyor 34. In practice, it has been found that a worker stationed at P1 and 2 can conveniently package the separated hearts and livers into individual containers.

In a general manner while there has been disclosed an effective and efficient embodiment of the invention, it should be well understood that the invention is not limited to such an embodiment, as there might be changes made in the arrangement, disposition, and form of the parts without departing from the principle of the present invention.

I claim:

1. An apparatus for automatically separating chicken hearts from chicken livers comprising,
   a conveyor belt having an upper and lower portion, said lower portion being disposed at a selected angle of inclination,
   a power means for moving said conveyor belt at a selected speed,
   a first means for receiving and moving a mixture of said chicken hearts and chicken livers from a reception area to the lower portion of said conveyor belt at a relatively uniform rate,
   said conveyor belt having a surface with a coefficient of friction causing said chicken livers to adhere but said hearts not to adhere to said lower portion at said selected speed and said angle of inclination,
   second means for collecting said chicken livers from the upper portion of said conveyor belt, and
   third means for collecting said hearts at the lower end of said lower portion of said conveyor belt.

2. The invention of claim 1 wherein said first means includes a horizontally disposed conveyor, a hopper disposed over one end thereof and a leveling means intermediate the ends of said conveyor.

3. The invention of claim 1 wherein said third means includes an inclined tray for collecting hearts dropping from said lower portion.

4. A method of separating chicken hearts from chicken livers including the steps of depositing a mixture thereof on a conveyor, spreading said mixture to obtain a substantially uniform layer on said conveyor, depositing said uniform layer on an inclined belt, moving said belt at a speed to permit adherence of said livers thereto while permitting said hearts to tumble to the bottom thereof.

* * * * *